Patented June 17, 1924.

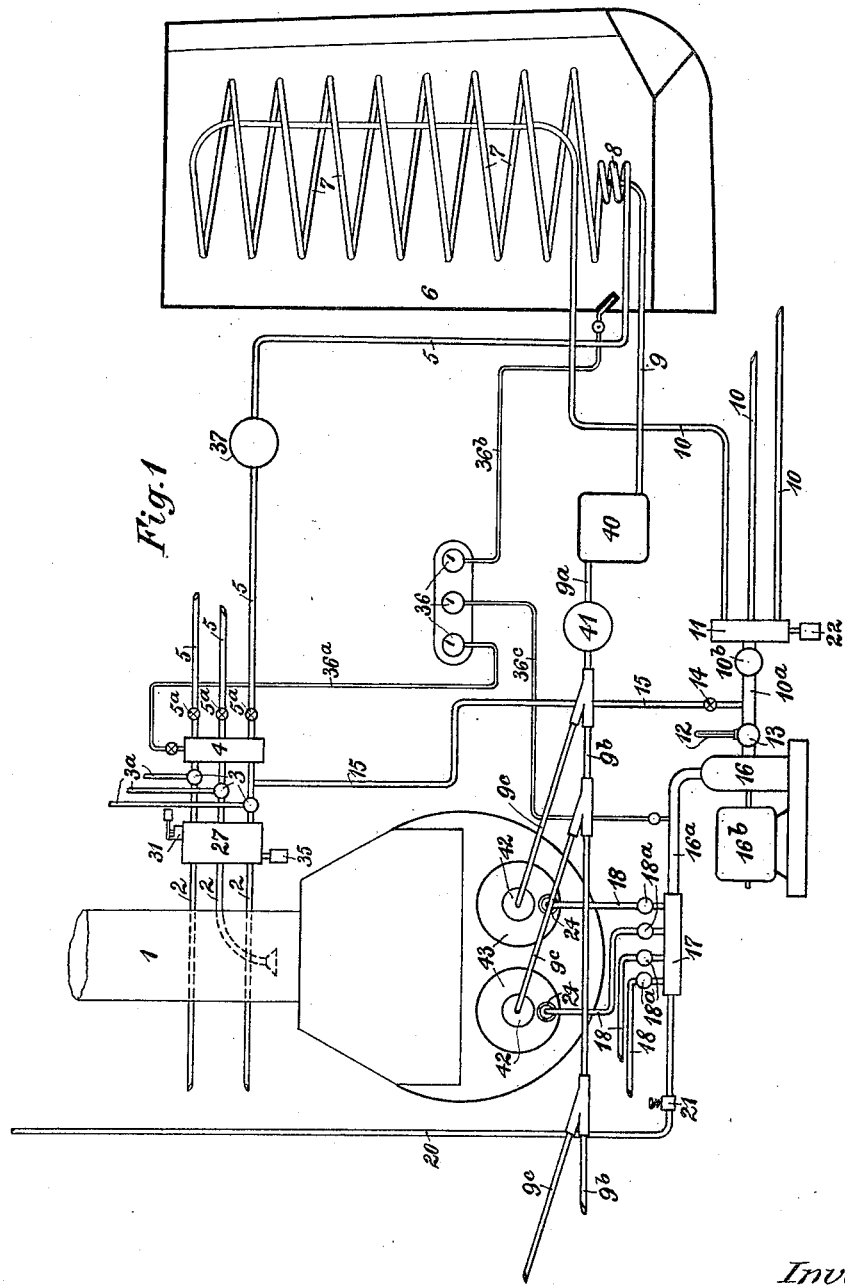

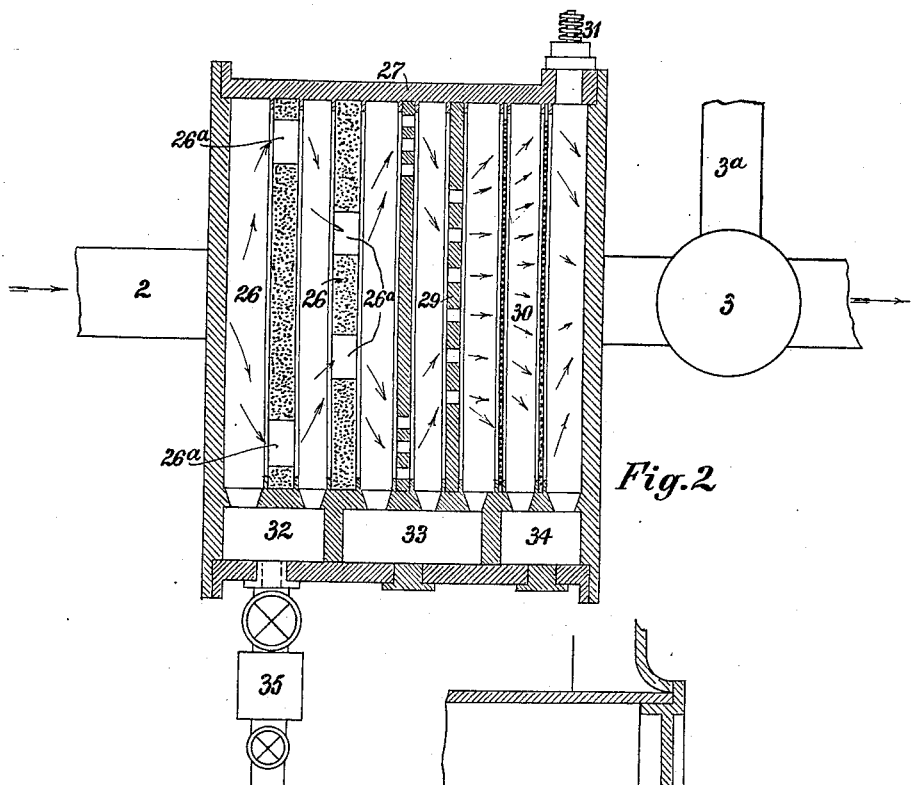
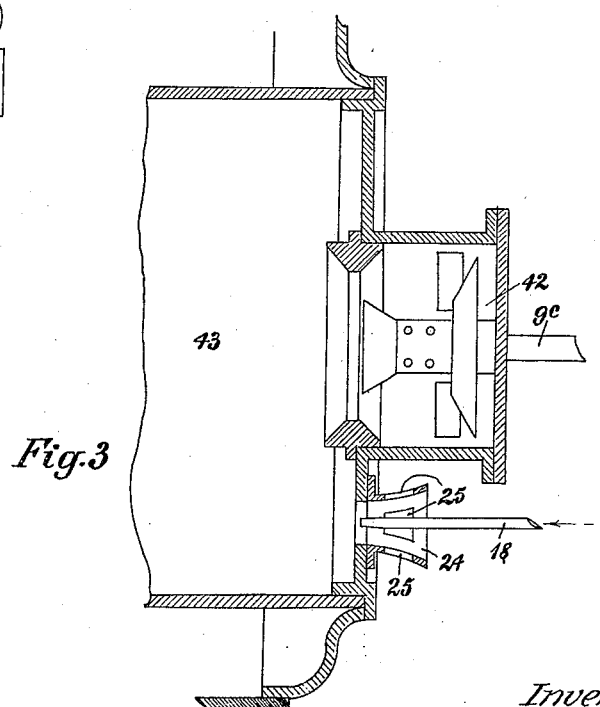

1,498,266

UNITED STATES PATENT OFFICE.

ADOLF OTTO ALFRED GRAUMANN, OF HAMBURG, GERMANY.

HOT-GAS HEATING SPECIALLY FOR THE OIL BUNKERS ON SHIPS.

Application filed June 21, 1923. Serial No. 646,983.

*To all whom it may concern:*

Be it known that I, ADOLF OTTO ALFRED GRAUMANN, a citizen of the German Republic, residing at Hamburg, Germany, have invented certain new and useful Improvements in Hot-Gas Heating Specially for the Oil Bunkers on Ships, of which the following is a specification.

This invention relates to hot gas heating specially for the oil bunkers on ships. The invention consists in using for the heating the hot gases from the chimney which are conveyed through conveniently arranged pipe systems by suction or pressure. The withdrawal of the hot gases from the chimney produces a vacuum therein which considerably assists the draft. The gases drawn off may be again put under pressure and conducted to the combustion spaces. By insertion of a mixing valve in the suction pipes it is possible to regulate at will the temperature in the hot pipe system by the admission of fresh air.

In the steam heating apparatus of known type it happens frequently that owing to strong condensation of steam so little heat is produced that the oil is only sufficiently liquefied for the supply to the oil furnace. By the improved hot gas heating the whole pipe system can be brought within a very short time to any desired temperature. There is no danger that leakages in the pipe system allow water to enter the oil reservoir, to interfere with combustion. Leakage in the pipe system of the present invention will be early indicated by the oil being drawn along by the draft, such oil collecting in a separator arranged in front of the suction apparatus. Ordinarily then it is necessary to stop the heating apparatus, only on the occurrence of a pipe fracture. It is further very important that the pipe system in the oil reservoir be kept always free from water to prevent freezing.

In the drawings an embodiment of the invention is shown by way of example.

Fig. 1 shows diagrammatically the whole plant.

Fig. 2 is a longitudinal section through the flame extinguisher.

Fig. 3 shows in longitudinal section the part of the boiler at which the oil is admitted.

In the chimney 1 the gas-withdrawal pipe 2 is arranged which, together with the similar pipes 2—2 coming from other similar places of withdrawal terminates in the air mixing valve 3 after having traversed a flame extinguisher. The valve 3 permits regulation of the temperature of the heating gases by the addition of cold air supplied by tube $3^a$, to prevent excessive heating of the parts to be heated. Pipes 5 connect the tubular gas distributor 4 with the pipe system 7 of the oil tanks, but one being shown. In the oil tank or bunker 6 a pipe system 7 is arranged adjacent the walls, so that the compact solid oil mass is liquefied and sinks towards the suction point which consists of a comparatively small serpentine coil 8. In this serpentine 8 the desired liquefaction of the descending oil is effected in a reliable manner owing to the narrow heated space, the oil flowing through tube 9 the open end of which extends within the coil 8 into a preliminary heater 40, and from there through a pump 41 to the nozzle 42 of the boiler furnaces 43. The tube connecting the preliminary heater 40 with the pump 41 is designated by $9^a$ and the tube leading on from pump 41 is designated by $9^b$, branch tubes $9^c$ for the nozzles 42 branching off from said tube $9^b$. The heating pipe 10 leading from the bunker 6 is connected with the upper end of the heating pipe system 7, and conducts the gases to a distributor 11, from which a tube $10^a$ leads to a pump 16. The temperature of the gases and the draft of the same is preferably regulated before the gases enter the pump 16. With this object in view a thermometer 12 and a valve 13 are provided. As may be required in the particular instance fresh hot gases from the chimney 1, or directly from a flame extinguisher 27 may be supplied to the tube $10^a$. The tube 15 with valve 14 serves the latter function, thus supplying the hot gases to the boiler furnaces when the oil bunker 6 is not to be heated. Under these conditions, the valves $5^a$ in the pipes 5 and the valve $10^b$ in tube $10^a$ are closed, and valve 14 opened so that the pump 16 driven by a motor $16^b$ draws the hot gases directly from the flame extinguisher 27. The pump 16 forces the gases through a tube $16^a$ to the tubular distributor 17, which is connected with the combustion chambers 43 by pipes 18 in which valves $18^a$ are inserted.

A pipe 20 leads from the distributor 17 to the atmosphere a safety valve 21 regulating the pressure automatically. The distributing tube 11 in the system is constructed to act at the same time as a separator so that oil drawn into the heating pipe system by leakage is separated and flows into collectors 22.

Appropriate indicating instruments 36 are provided for indicating pressure, vacuum, and the like, and are shown as connected, for example, to the distributor 4 by conduit 36ª, to the oil burner 6 by conduit 36ᵇ, and to the tube 16ª by conduit 36ᶜ.

The flame-extinguisher 27 (Fig. 3) prevents flames which may be drawn into the gas pipe 2 from getting to the tubular distributor 4. The flame-extinguisher consists of a vessel of such size that the velocity of gas flowing through this vessel is as low as possible. Two or more partitions 26 of refractory material relatively offset channels 26ª, serve for intercepting the flames, and for distributing and extinguishing the same, as the flames cannot continue to burn without a sufficient quantity of oxygen. In order to increase the security, several perforated sheet iron plates 29 and also two wire screens 30, may be arranged beyond the partitions 26. The safety valve 31 permits the escape of gases which may be produced after the stopping of the plant. The chambers 32, 33 and 34 serve for collecting the soot. An oil collector 35 is arranged for collecting condensed oil.

In Fig. 3 the arrangement of the hot gas mixing nozzle is shown in section. The tube 18 for the gas under pressure terminates in a nozzle system 24 so that through the adjustable openings 25 fresh air for combustion is sucked in which is heated in the nozzle before it gets into the furnace 43.

When the gases are not to be sucked through the oil bunkers but forced through the same a pump 37 is inserted in each pipe 5. In this case the pump 16 is omitted.

I claim:—

1. A means for utilizing the heat of the products of combustion for heating liquid fuel, consisting in a conduit open to the products of combustion, a flame extinguisher to which the conduit delivers the products of combustion for the extinguishment of flame, a conduit leading from the flame extinguisher, a fuel tank, a fuel outlet pipe therefrom having its entrance end opening within the tank, said conduit being arranged within the tank adjacent the wall thereof and formed to provide a coil closely enveloping the entrance end of the fuel pipe, a pump communicating with the conduit beyond the fuel tank, pipe connections leading from said pump to the point of combustion of the fuel, whereby the products of combustion may be forced back into the furnace, and a bypass leading from the conduit immediately beyond the flame extinguisher to the conduit immediately in advance of the pump, whereby to bypass the tank heating.

2. A means for utilizing the heat of the products of combustion for heating liquid fuel, consisting in a conduit open to the products of combustion, a flame extinguisher to which the conduit delivers the products of combustion for the extinguishment of flame, a conduit leading from the flame extinguisher, means for admitting air to said conduit, a fuel tank, a fuel outlet pipe therefrom having its entrance end opening within the tank, said conduit being arranged within the tank adjacent the wall thereof and formed to provide a coil closely enveloping the entrance end of the fuel pipe, a pump communicating with the conduit beyond the fuel tank, and pipe connections leading from said pump to the point of combustion of the fuel, whereby the products of combustion may be forced back into the furnace.

In testimony whereof I affix my signature in presence of two witnesses.

ADOLF OTTO ALFRED GRAUMANN.

Witnesses:
 FRIEDRICH JULIUS TOTHS,
 E. KASPAREK.